United States Patent
Rodolico (10) Patent No.: US 7,102,699 B2
(45) Date of Patent: Sep. 5, 2006

(54) RADIO FREQUENCY DISTRIBUTION NETWORK SYSTEM

(75) Inventor: Joseph T. Rodolico, Horsham, PA (US)

(73) Assignee: Matsushita Electric Industrial Co. Ltd., Osaka (JP)

( * ) Notice: Subject to any disclaimer, the term of this patent is extended or adjusted under 35 U.S.C. 154(b) by 649 days.

(21) Appl. No.: 10/098,305

(22) Filed: Mar. 14, 2002

(65) Prior Publication Data
US 2003/0177499 A1 Sep. 18, 2003

(51) Int. Cl.
H04N 5/38 (2006.01)

(52) U.S. Cl. .................. 348/723; 348/705; 725/78; 710/9; 710/36; 455/500

(58) Field of Classification Search .............. 348/723, 348/724, 552, 705, 706; 725/74, 78, 80, 725/82, 85, 133; 710/9, 11, 36, 38, 62–64; 455/3.04, 3.05, 500, 509; 370/343, 344
See application file for complete search history.

(56) References Cited

U.S. PATENT DOCUMENTS

| | | | | |
|---|---|---|---|---|
| 4,029,902 A * | 6/1977 | Bell et al. ................... 370/497 |
| 4,599,587 A * | 7/1986 | Hartmann et al. .......... 333/176 |
| 5,202,656 A * | 4/1993 | Clark et al. ................. 333/174 |
| 5,325,204 A * | 6/1994 | Scarpa ....................... 348/607 |
| 5,351,269 A * | 9/1994 | Schilling .................... 370/335 |
| 5,389,964 A * | 2/1995 | Oberle et al. ................ 725/34 |
| 5,450,392 A * | 9/1995 | Waltrich ..................... 370/201 |
| 5,574,964 A * | 11/1996 | Hamlin ........................ 725/78 |
| 5,812,665 A * | 9/1998 | Hoarty et al. ............... 380/212 |
| 5,907,715 A * | 5/1999 | Stoel et al. .................... 710/46 |
| 5,922,061 A * | 7/1999 | Robinson .................... 710/109 |
| 6,020,783 A * | 2/2000 | Coppola ..................... 327/556 |
| 6,118,497 A | 9/2000 | Pugel |
| 6,188,446 B1 * | 2/2001 | Aitken ....................... 348/723 |
| 6,202,211 B1 * | 3/2001 | Williams, Jr. ................ 725/78 |
| 6,278,498 B1 * | 8/2001 | Neff ........................... 348/723 |
| 6,286,142 B1 * | 9/2001 | Ehreth ......................... 725/78 |
| 6,418,302 B1 * | 7/2002 | Kobayashi .................. 455/103 |
| 6,481,013 B1 * | 11/2002 | Dinwiddie et al. ........... 725/80 |
| 6,622,307 B1 * | 9/2003 | Ho ............................. 725/120 |
| 6,637,030 B1 * | 10/2003 | Klein .......................... 725/78 |
| 2003/0115608 A1 * | 6/2003 | Armstrong et al. ........... 725/78 |
| 2003/0192053 A1 * | 10/2003 | Sheppard et al. ............. 725/81 |

* cited by examiner

Primary Examiner—Victor R. Kostak
(74) Attorney, Agent, or Firm—RatnerPrestia (57) ABSTRACT

A consumer electronic device includes circuitry configured to produce a signal corresponding to a selected one of first, second and third radio frequency channel. The circuitry includes a modulator configured to modulate the video signal such that it falls within a first predetermined frequency range, corresponding to the selected channel. The respective frequency ranges for the first, second and third radio frequency channels are mutually exclusive. Multiple consumer electronic devices are coupled to a combiner which generates a combined signal including the modulated signals from all of the devices. This signal is distributed to a plurality of receivers such that each receiver can receive any of the modulated signals without interference from any of the other modulated signals. The device may also be implemented as a stand-alone device that receives baseband signals, modulates the signals and combines the modulated signals to produce the combined signal.

11 Claims, 9 Drawing Sheets

RADIO FREQUENCY DISTRIBUTION NETWORK SYSTEM

TECHNICAL FIELD

The present invention relates generally to consumer electronic devices, and more particularly, to the integration of multiple consumer electronic devices within a radio frequency distribution network.

BACKGROUND OF THE INVENTION

The number of consumer electronic video devices which utilize some form of video display has increased in recent years. For example, it is common to use a television or computer monitor to display a signal from a video cassette recorder (VCR) or a digital video disc (DVD) player. Further, it is also common to modulate a baseband television signal generated by the VCR to form a single channel signal (e.g. a channel 4 signal) and to send the single channel signal from a consumer electronic video device to multiple display devices throughout a home or office.

Typically, a specific channel on a television receiver, and a corresponding frequency, is utilized to view a video signal from a consumer electronic video device. Conventionally, in the United States, either channel 3 or channel 4 is used to display video signals from a consumer electronic video device. Many, radio frequency distribution devices have been designed with an internal switching mechanism for switching between channels 3 and 4. Channel 3 is used in markets where channel 4 is active, and channel 4 is used in markets where channel 3 is active to prevent interference between the locally modulated signal and the active broadcast signal.

Figure 1:
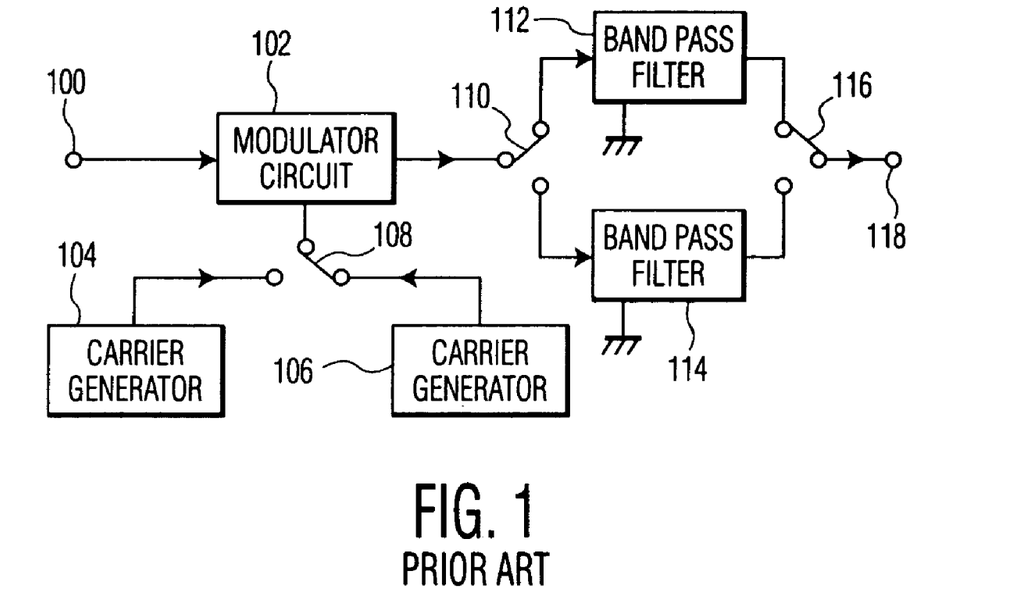
FIG. 1 is a block circuit diagram illustrating a prior art radio frequency signal distribution system.

FIG. 1 provides a block circuit diagram of a conventional video distribution signal circuit (a radio frequency converter in this example) within a consumer electronic video device, such as a video cassette recorder. A radio frequency distribution signal (e.g. a baseband television signal) is applied to a terminal 100, and then is transmitted to a modulator circuit 102. The modulator circuit 102 converts the video signal to a signal that can be received by a television receiver (not shown). The circuit also includes two carrier generators 104 and 106. A switch 108 is provided to choose which carrier generator transmits its respective carrier frequency to the modulator circuit 102. For example, the carrier frequency transmitted by carrier generator 104 may correspond to channel 3, while the carrier frequency transmitted by carrier generator 106 may correspond to channel 4. When switch 108 connects modulator circuit 102 to carrier generator 106 (as shown in FIG. 1), carrier generator 106 transmits a respective carrier frequency (i.e. the carrier frequency for channel 4) to modulator circuit 102. In contrast, when switch 108 connects modulator circuit 102 to carrier generator 104, carrier generator 104 transmits a respective carrier frequency (i.e. the carrier frequency for channel 3) to modulator circuit 102.

In a typical arrangement, the carrier frequencies produced by carrier generators 104 and 106 shown in FIG. 1 overlap one another and therefore are filtered in order to meet broadcast standards. Accordingly, the circuit includes bandpass filters 112 and 114. One of the band pass filters functions to filter the signal to an appropriate frequency range for channel 3, while the second bandpass filter functions to filter the signal to an appropriate frequency range for channel 4.

For example, the carrier frequency transmitted by carrier generator 104 may correlate to channel 3, and the bandpass filter 112 may also correlate to channel 3. In such a situation, when a user switches to channel 3 (i.e. by remote control of the consumer electronic video device), switch 108 switches such that carrier generator 104 (and not carrier generator 106) transmits carrier frequency signals to modulator circuit 102, and further, switches 110 and 116 (operating in tandem, preferably with switch 108) switch such that band pass filter 112 (and not band pass filter 114) filters the signal. Conversely, the carrier frequency transmitted by carrier generator 106 may correlate to channel 4, and the bandpass filter 114 may also correlate to channel 4. In such a situation, when a user changes the VCR to use channel 4, switch 108 switches such that carrier generator 106 transmits carrier frequency signals to modulator circuit 102, and further, switches 110 and 116 switches such that band pass filter 114 filters the signal. In either of the scenarios described above, a modulated signal is produced at terminal 118 for receipt by a television receiver.

An improvement to the above-described circuit is disclosed in U.S. Pat. No. 4,213,152, due to Kakinuma, and illustrated in FIG. 2 of the present application. As described above with reference to FIG. 1, FIG. 2 illustrates a terminal 100 that receives a radio frequency distribution signal, which is then transmitted to a modulator circuit 102. The circuit also includes two carrier generators 104 and 106 which are controlled by a switch 108. As described above, the carrier frequency transmitted by carrier generator 104 may correlate to channel 3, while the carrier frequency transmitted by carrier generator 106 may correlate to channel 4.

The respective carrier frequencies overlap one another, and are filtered in order to comply with broadcast standards. In contrast to the method described with respect to FIG. 1, the simplified configuration illustrated in FIG. 2 includes a first filter 202 that is always activated, and a second filter 204 that may be activated by a switch 208. Whether or not the second filter 204 is activated depends upon which channel is being utilized (i.e. channel 3 or channel 4). Filter 202 eliminates a portion the lower sideband of the channel 3 signal while filter 204 eliminates the same portion the lower sideband of the channel 4 signal.

Figure 2:
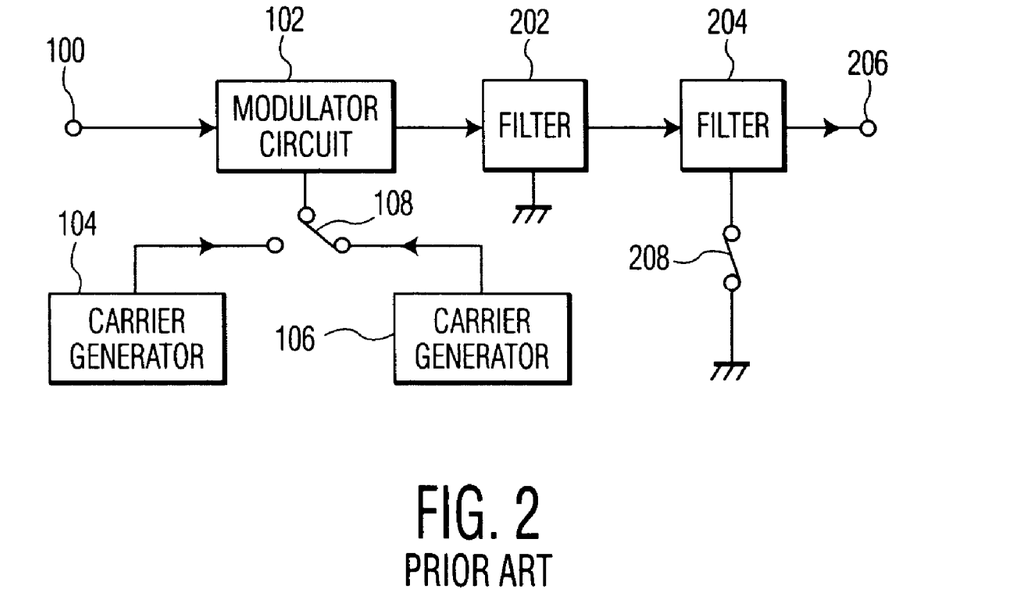
FIG. 2 is a block circuit diagram illustrating another prior art radio frequency signal distribution system.

The systems described by reference to FIG. 1 and FIG. 2 may utilize a single cable (i.e. a coaxial cable) to transmit a signal from the video distribution device (i.e. a video cassette recorder) to a television receiver. In both examples, one of a pair of channels (i.e. either channel 3 or 4) may be used to transmit the signal to the television receiver.

Current consumer electronic video devices, such as satellite set-top boxes (IRDs) and video cassette recorders (VCRs), support either a channel 3 or a channel 4 radio frequency output to a display device (i.e. a television or a personal computer with a radio frequency input terminal). Attempts have been made to utilize a single coaxial cable to transmit radio frequency signals for two distinct channels (channel 3 and channel 4) simultaneously. For example, two satellite set-top boxes have been installed on a single network coaxial cable, with the first of the set-top boxes using a channel 3 output, and the second of the set-top boxes using a channel 4 output. However, such systems have had problems with distortion and interference between the channel 3 signal and the channel 4 signal. A primary reason for this distortion is that the consumer electronic video devices (i.e. IRDs) utilize a radio frequency output that violates the 6 megahertz bandwidth specifications of the National Television System Committee (NTSC). Because of this interference, costly external radio frequency modulators have been added to the distribution system in an attempt to move one of the IRD channels (either channel 3 or 4) to a non adjacent channel, which is usually located on the high end of the channel spectrum (e.g., in the UHF spectrum). The addition of external modulation circuitry has achieved only marginal success, and results in significant additional costs.

Therefore, it would be desirable for a radio frequency distribution network system to provide for two or more channels (each channel carrying a signal from a consumer electronic video device) along a single cable, without interference between the channels, and without the necessity for additional external modulation circuitry.

SUMMARY OF THE INVENTION

A first embodiment of the present invention provides multiple consumer electronic video devices, such as a video cassette recorder, digital video disc player, cable set-top box, satellite set-top box or a gaming unit. Each of the consumer electronic video devices includes filtering and modulation circuitry such that output signals may be provided for any of three or more radio frequency channels. Therefore, each consumer electronic video device may provide an output signal for any of the three or more channels, such as channels 3, 4, 5, et cetera. Each of the consumer electronic video devices may include an output port for each of the channels (i.e., a channel 3 output port, a channel 4 output port, and a channel 5 output port). However, in an effort to reduce construction costs and simplify the system design, each of the consumer electronic video devices may provide a single output port for use with any of the channels (i.e., a single output port for use with a channel 3 signal, a channel 4 signal, or a channel 5 signal). Further, each consumer electronic video device includes modulation and filtering circuitry such that each signal falls below the single channel bandwidth set by the broadcast standard. Therefore, the signals from each of the consumer electronic video devices can be combined and concurrently transmitted, along a coaxial cable, for example, to any number of video display devices (e.g., television sets, personal computers, etc). In such an embodiment, because the signals are properly modulated and filtered, no additional modulation equipment is required in order to prevent interference between the channels.

Although the first embodiment described above specifically refers to consumer electronic video devices (e.g., VCRs, DVD players, etc.) as the signal source, this is simply an exemplary embodiment. The signal source may be provided by any consumer electronic device, such as a consumer audio device (e.g., a compact disc player) or a consumer data device (e.g., a computer, a gaming system, etc). Further, although the first embodiment described above specifically refers to video display devices for receiving a combined output signal, this is simply an exemplary embodiment. The output signal may be received by any consumer electronic device, such as an audio receiver or a data receiving device (e.g., a computer).

In a second embodiment of the present invention, multiple consumer electronic video devices are provided. Each consumer electronic video device may provide an output signal for any of the four or more channels, such as channels 3, 4, 5, 6, et cetera. As with the first embodiment, each of the consumer electronic video devices may include an output port for each of the channels (e.g. for channels 3, 4, 5, and 6) or each device may provide a single output port for use with any of the channels. Further, each consumer electronic video device includes modulation and filtering circuitry such that each signal falls within the single channel bandwidth set by the applicable broadcast standard. Therefore, the signals from each of the consumer electronic video devices can be combined and concurrently transmitted to any number of video display devices. In such an embodiment, because the signals are properly modulated and filtered, no additional modulation equipment is required in order to prevent interference among the four channels.

Although the second embodiment described above specifically refers to consumer electronic video devices (e.g., VCR) as the signal source, and video display devices for receiving a combined output signal, this is simply an exemplary embodiment. The signal source may be provided by any consumer electronic device, such as a consumer audio device (e.g., a compact disc player) or a consumer data device (e.g., a computer, a gaming system, etc.) and the output signal may be received by any consumer electronic device, such as a audio receiver or a data receiving device (e.g., a computer).

In a third embodiment of the present invention, multiple consumer electronic video devices (source devices) are provided, as in the previous embodiment. Again, each of the consumer electronic video devices includes filtering and modulation circuitry such that output signals may be provided for any of three or more radio frequency channels. As described above, the signals from each of the consumer electronic video devices can be combined and concurrently transmitted to any number of video display devices. However, in this embodiment the combined output signal may be applied to an input port of one of the consumer electronic video devices (source devices). For example, a signal from a digital video disc player may be combined with the signals from several other consumer electronic video devices (including a video cassette recorder), each with a distinct frequency having a bandwidth of less than the bandwidth of a single channel signal. The combined signal may be sent to numerous video display devices, but may also be sent to the video cassette recorder, one of the source devices. For example, the video cassette recorder may record the data from the digital video disc player. As with the previously described embodiments, because the signals are properly modulated and filtered, no additional modulation equipment is required in order to prevent interference among the four or more channels.

As with the first and second embodiments, although the third embodiment described above specifically refers to consumer electronic video devices as signal sources, and video display devices for receiving a combined output signal, this is simply an exemplary embodiment. Any consumer electronic device may be used to supply the signal source or to receive an output signal.

In a fourth embodiment, a device is provided for receiving baseband signals from conventional consumer electronic video devices. These conventional devices may include circuitry for providing a baseband video output signal. The device provided in the fourth embodiment receives baseband signals from the multiple conventional consumer electronic video devices, and then modulates each of the signals so that each signal is contained within its own frequency band with a bandwidth of less than the bandwidth of a single channel signal under the applicable broadcast standard. The modulated signals are then combined and distributed along a single cable (i.e., a coaxial cable) to any number of video display devices.

Although the fourth embodiment specifically refers to a device for receiving baseband signals from electronic video devices, any type of consumer electronic device may be used to supply signals.

In a fifth embodiment, notch filters are provided in series with each of the consumer electronic video device transmission circuits. The notch filters are used to filter interference from adjacent radio frequency channels. The filtered signals are then combined in a combiner and transmitted to any number of video display devices similarly to previously described embodiments. The notch filters may be packaged in the individual consumer electronic video devices or in the signal combiner.

Although the fifth embodiment specifically refers to a notch filters in series with consumer electronic video devices, any consumer electronic device transmission circuit could be provided in series with a notch filter.

In a sixth embodiment, at least two consumer electronic devices provide source signals (e.g., video signals) that are in adjacent frequency ranges (e.g., channel 3 and channel 4 NTSC television signals). A radio frequency distribution device receives the source signals, and each of the source signals is filtered by a respective notch filter. The filtered signals are then combined in a combiner (preferably included in the radio frequency distribution device).

BRIEF DESCRIPTION OF THE DRAWINGS

The invention is best understood from the following detailed description when read in connection with the accompanying drawings. It is emphasized that, according to common practice, the various features of the drawing are not to scale. On the contrary, the dimensions of the various features are arbitrarily expanded or reduced for clarity. Included in the drawings are the following figures.

DETAILED DESCRIPTION OF THE INVENTION

Although several of the exemplary embodiments of the invention are described in terms of a 6 MHz channel used to transmit signals corresponding to the standard adopted by the National Television Standards Committee (NTSC), it is applicable to other broadcast standards such as PAL, SECAM, QAM, Trellis coded VSB, and HDTV (e.g., the decoded HDTV baseband component could be modulated onto a radio frequency signal).

Figure 3:
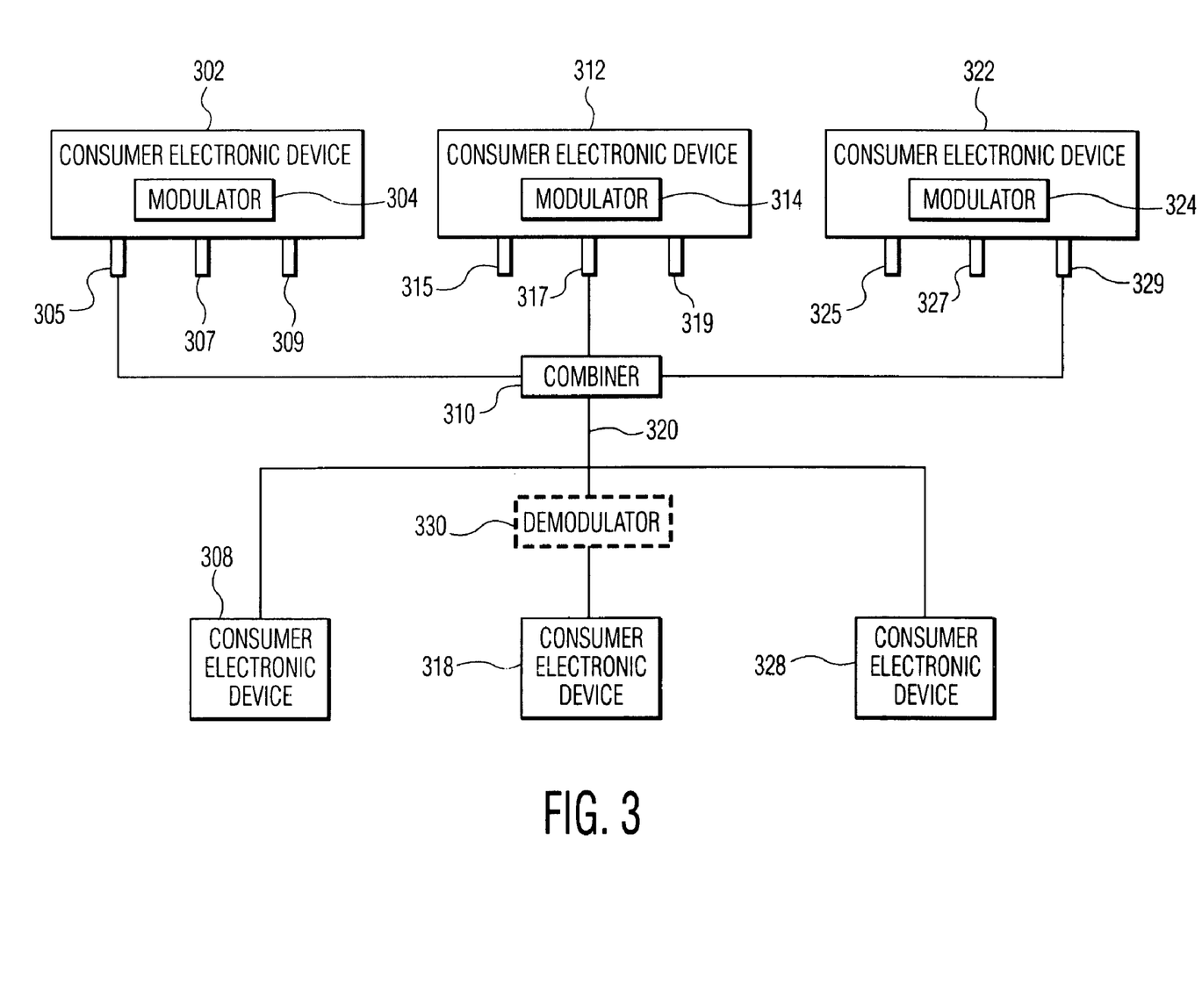
FIG. 3 is a block circuit diagram illustrating a radio frequency signal distribution system in accordance with an exemplary embodiment of the present invention.

FIG. 3 illustrates a first exemplary embodiment of the present invention. A first consumer electronic device 302, such as a video cassette recorder, digital video disc player, cable set-top box, satellite set-top box, S-video source (e.g., components Y, $C_R$, $C_B$ may be separated/modulated for use as source signals), gaming unit, audio device (e.g., a compact disc player), a personal video recorder, or a data or voice source device is provided.

Device 302 includes a modulator 304 for varying a carrier signal in accordance with the modulating signal. Device 302 also includes a first channel output port 305, a second channel output port 307, and a third channel output port 309. Ports 305, 307, and 309 are each for use with a distinct channel. For example, in a video device network system, port 305 provides an output for a channel 3 signal, port 307 provides an output for channel 4 signal, and port 309 provides an output port for a channel 5 signal. Although the embodiment illustrated in FIG. 3 includes an output port (305, 307, 309) for each radio frequency channel (e.g., channel 3, channel 4, channel 5), a single output port may be used for all of the channels.

Another consumer electronic device 312 is also provided in FIG. 3. Device 312 includes a modulator 314 for varying a carrier signal in accordance with the modulating signal. Device 312 also includes a first channel output port 315, a second channel output port 317, and a third channel output port 319. For example, device 312 may be an audio electronic device (e.g., a compact disc player) and each output port could provide an output audio signal in one of numerous frequency ranges. As with device 302, device 312 may have a single output port that may be used as an output for signals from any audio channel, as opposed to individual output ports 315, 317, and 319 as illustrated in FIG. 3.

A third consumer electronic video device 322 is also provided in FIG. 3. Device 322 includes a modulator 324 for varying a carrier signal in accordance with the modulating signal. Device 322 also includes a first channel output port 325, a second channel output port 327, and a third channel output port 329. For example, device 322 may be an data source electronic device (e.g., a personal computer) and each output port could provide an output data signal in one of numerous frequency ranges. As with devices 302 and 312, device 322 may have a single output port that may be used as an output for signals from data channel, as opposed to individual output ports 325, 327, and 329 as illustrated in FIG. 3.

Therefore, in an exemplary embodiment, device 302 transmits an output channel 3 video signal through port 305, device 312 transmits an output audio signal through port 317, and device 322 transmits an output data signal through port 329. The signals from ports 305, 317, and 329 are combined in combiner 310. Combiner 310 may simply be a conventional television signal splitter device having its output terminals configured as input terminals and its input terminal configured as an output terminal. Alternatively, any other conventional signal combination device such as a directional coupler may be used. Combiner 310 may include appropriate filtering circuitry (e.g., VSB filters) and amplification circuitry as is necessary. The combined signal is then transmitted along cable 320, which may be a coaxial cable. Cable 320 distributes the combined signal to consumer electronic devices 308, 318, and 328. For example, display device 308 may be tuned to receive the channel 3 signal from device 302. Device 318 may be tuned to receive the audio signal output from device 312. If appropriate demodulation circuitry is not included in device 318, a demodulator 330 may optionally be used to demodulate the modulated audio signal from device 312. Demodulator 330 may be used, for example, when an audio signal from a CD player modulates an RF signal and the device 318 is an amplifier. Device 328 may be tuned to receive the data signal from device 322. Because adequate modulation and filtering circuitry are provided in each of the consumer electronic devices 302, 312, and 322, or in combiner 310, interference between the channel 3 signal, the audio signal, and the data signal is substantially eliminated.

Figure 4:
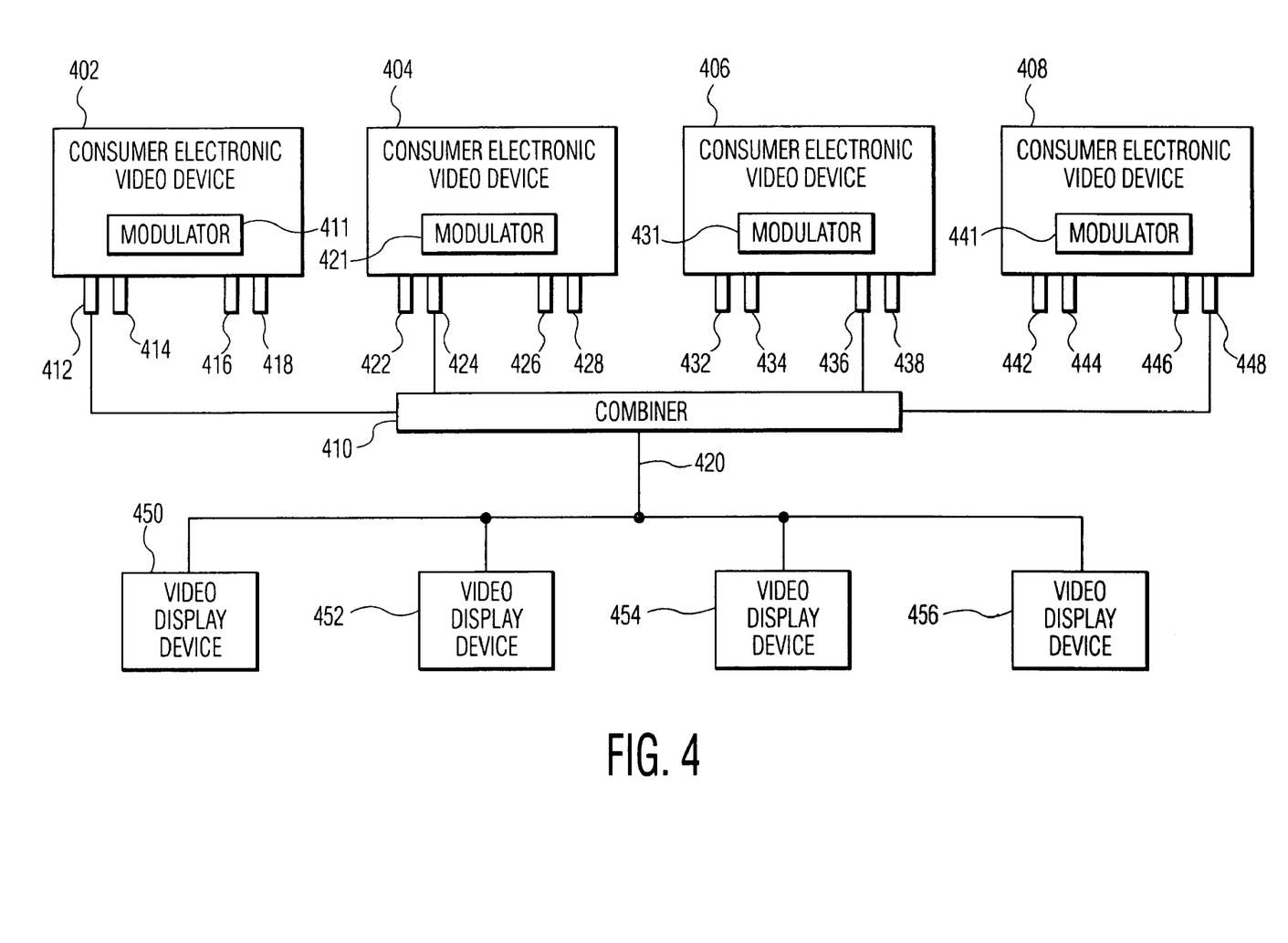
FIG. 4 is a block circuit diagram illustrating a radio frequency signal distribution system in accordance with another exemplary embodiment of the present invention.

FIG. 4 illustrates a second exemplary embodiment of the present invention. In this embodiment, each consumer electronic device is a video device, however, each device could be any type of consumer electronic device, such as an audio device or a data device. A first consumer electronic video device 402, such as a video cassette recorder, digital video disc player, cable set-top box, satellite set-top box or a gaming unit, is provided. Device 402 includes a modulator 411 for varying a carrier signal in accordance with the modulating signal. Device 402 also includes a first channel output port 412, a second channel output port 414, a third channel output port 416, and a fourth channel output port 418. Ports 412, 414, 416 and 418 are each for use with a distinct channel. For example, port 412 provides an output for channel 3, port 414 provides an output for channel 4, port 416 provides an output for channel 5, and port 418 provides an output for channel 6. Although the embodiment illustrated in FIG. 4 includes an output port (412, 414, 416 and 418) for each radio frequency channel (channel 3, channel 4, channel 5 and channel 6, respectively), a single output port may be used for all of the channels.

Three additional consumer electronic video devices, 404, 406, and 408, are also provided in the distribution system illustrated in FIG. 4. Device 404 includes a modulator 421 and four output ports 422, 424, 426, and 428, each for use with a respective channel. For example, port 422 provides an output for channel 3, port 424 provides an output for channel 4, port 426 provides an output for channel 5, and port 428 provides an output for channel 6. Device 406 includes a modulator 431, and four output ports 432, 434, 436, and 438, each for use with a respective channel. For example, port 432 provides an output for channel 3, port 434 provides an output for channel 4, port 436 provides an output for channel 5, and port 438 provides an output for channel 6. Likewise, device 408 includes a modulator 441, and four output ports 442, 444, 446, and 448, each for use with a respective channel. For example, port 442 provides an output for channel 3, port 444 provides an output for channel 4, port 446 provides an output for channel 5, and port 448 provides an output for channel 6. As with device 402, devices 404, 406, and 408 may each include a single output port that may be used to provide output signals from any of the four channels, as opposed to an individual output port being provided for each channel as shown in FIG. 4.

As shown in FIG. 4, port 412 is used for transmission of a channel 3 signal, port 424 is used for transmission of a channel 4 signal, port 436 is used for transmission of a channel 5 signal, and port 448 is used for transmission of a channel 6 signal. The signals from ports 412, 424, 436, and 448 are combined in combiner 410, and the combined signal is then transmitted along cable 420, which may be a coaxial cable. Combiner 410 may be a converted four-way television signal splitter having its input port configured as an output port and its output ports configured as input ports. Cable 420 distributes the combined signal to video display devices 450, 452, 454 and 456. For example, display device 450 may be tuned to receive the channel 3 signal, display device 452 may be tuned to receive the channel 4 signal, display device 454 may be tuned to receive the channel 5 signal, and display device 456 may be tuned to receive the channel 6 signal. Because adequate modulation and filtering circuitry are provided in each of the consumer electronic video devices 402, 404, 406, and 408, interference between the channel 3, 4, 5, and 6 signals is substantially eliminated.

Figure 5:
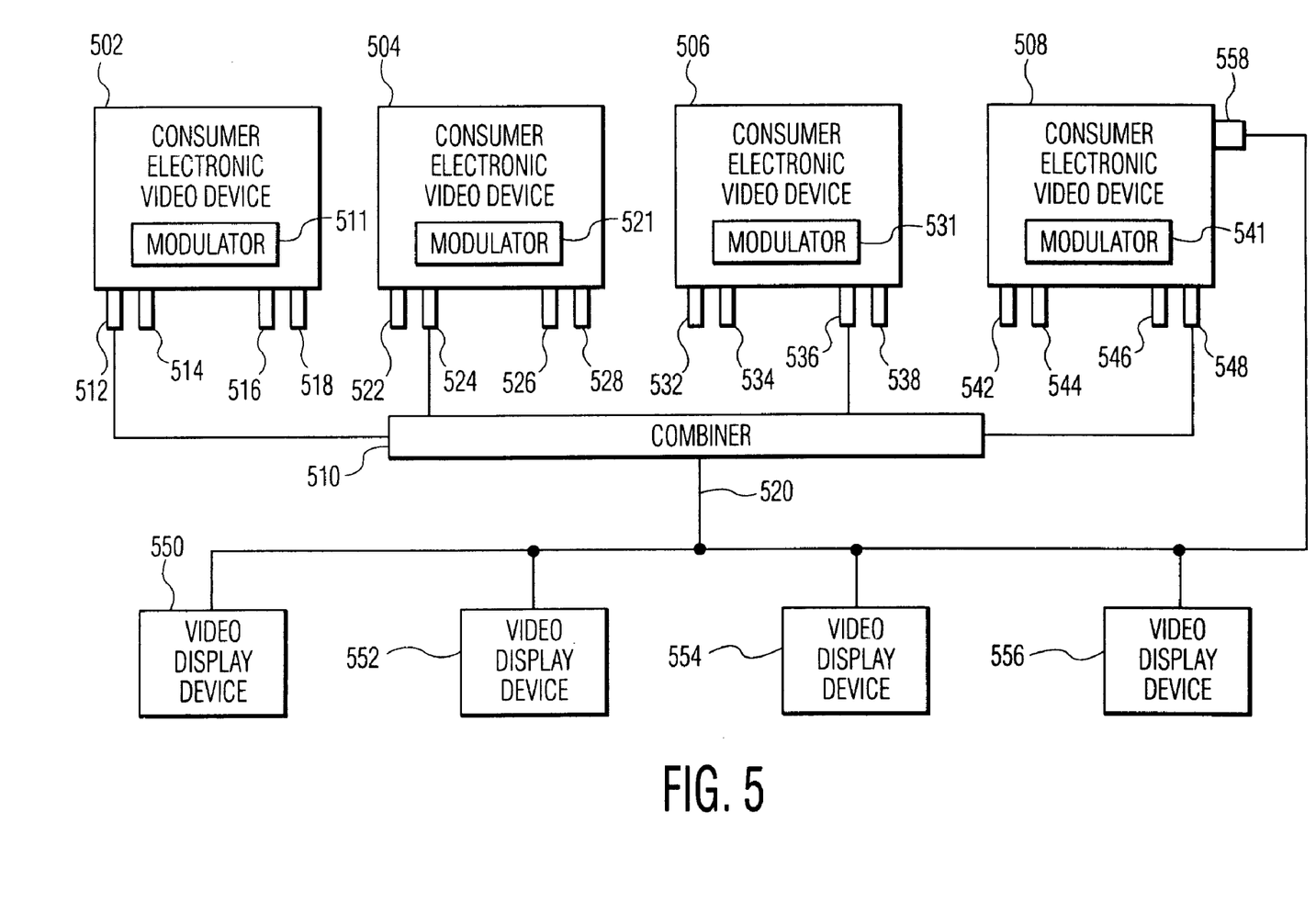
FIG. 5 is a block circuit diagram illustrating a radio frequency signal distribution system in accordance with yet another exemplary embodiment of the present invention.

FIG. 5 illustrates a third embodiment of the present invention. In this embodiment, each consumer electronic device is a video device, however, each device could be any type of consumer electronic device, such as a audio device or a data device. In FIG. 5, four consumer electronic video devices, 502, 504, 506, and 508 are provided. Device 502 includes a modulator 511 and four output ports 512, 514, 516, and 518, each for use with a respective channel as described above. Device 504 includes a modulator 521 and four output ports 522, 524, 526, and 528, each for use with a respective channel. Device 506 includes a modulator 531 and four output ports 532, 534, 536, and 538, each for use with a respective channel. Likewise, device 508 includes a modulator 541 and four output ports 542, 544, 546, and 548, each for use with a respective channel.

As with the embodiment described by reference to FIG. 4, devices 502, 504, 506 and 508 each may include a single output port which may be used to transmit a signal for any of the four channels, as opposed to an output port for each channel.

As shown in FIG. 5, port 512 is used for transmission of a channel 3 signal, port 524 is used for transmission of a channel 4 signal, port 536 is used for transmission of a channel 5 signal, and port 548 is used for transmission of a channel 6 signal. The signals from ports 512, 524, 536, and 548 are combined in combiner 510, and then the combined signal is then transmitted along cable 520, which may be a coaxial cable. Cable 520 distributes the combined signal to video display devices 550, 552, 554 and 556. Display device 550 may be tuned to receive the channel 3 signal, display device 552 may be tuned to receive the channel 4 signal, display device 554 may be tuned to receive the channel 5 signal, and display device 556 may be tuned to receive the channel 6 signal. Because adequate modulation and filtering circuitry are provided in each consumer electronic video device, interference between the channel 3, 4, 5, and 6 signals is substantially eliminated.

Although the embodiment described above includes a single display device for each channel, this is simply an illustration. Therefore, numerous display devices, for example 550, 552, and 554 could all be tuned to receive the channel 3 signal, while display device 556 could be tuned to receive a different signal, for example, the channel 5 signal.

Further, the combined signal transmitted from combiner 510 does not necessarily need to be transmitted to a video display device. For example, it may be desirable for a given consumer electronic video device to receive the signal from another consumer electronic video device. This may occur, for example, when it is desired to send the output signal from a digital video disc player (a first consumer electronic video device) to a video cassette recorder (a second consumer electronic video device) so that the video cassette recorder may record the output signal. As shown in FIG. 5, combiner 510 transmits an output signal which is split among video display device 550, video display device 552, video display device 554, video display device 556, and consumer electronic video device 508 (entering through input port 558). For example, if output port 512, of consumer electronic video device 502, is utilized as a channel 3 output channel, input port 558 of consumer electronic video device 508 could be utilized as a channel 3 input signal. As such, the radio frequency signal distribution system illustrated by reference to FIG. 5 is "bidirectional" in that the signals transmitted to the combiner 510 by the source devices may be transmitted to a video display device, or to a source device.

Further, one consumer electronic device (e.g., a video display device) may be used to control another consumer electronic device (e.g., a video playback device). Therefore, in the exemplary embodiment shown in FIG. 5, one of the video display devices, such as device 556, could be used to control device 508 by transmitting a control signal to port 558. As such, this is another "bidirectional" aspect of the embodiment illustrated in FIG. 5. Further still, device 556 could be used to provide both a video supply signal and a control signal to device 508 via port 558.

In some circumstances it may be desirable to distribute radio frequency signals for two or more channels using conventional consumer electronic video devices, along a single cable. This is especially true because of the expense that would be incurred in the replacement of numerous consumer electronic video devices. Therefore, an additional embodiment of the present invention provides a device for receiving output signals from multiple conventional consumer electronic video devices.

Figure 6:
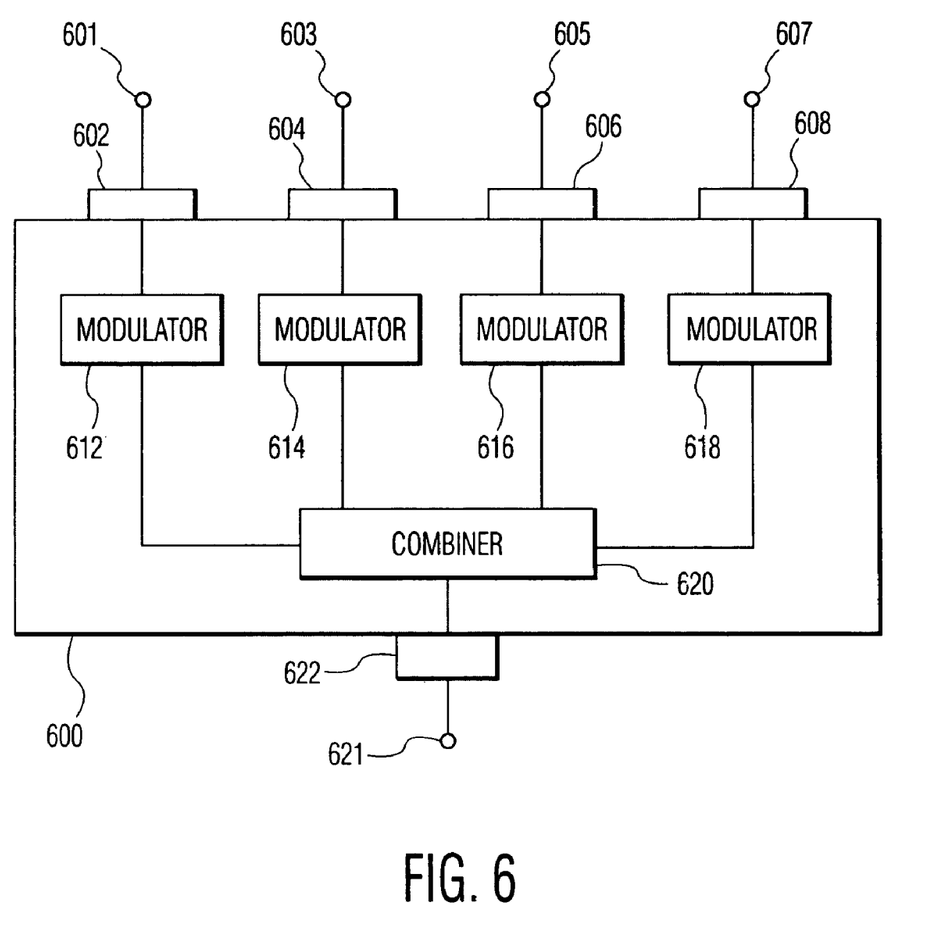
FIG. 6 is a block circuit diagram illustrating a radio frequency signal distribution device in accordance with an exemplary embodiment of the present invention.

FIG. 6 illustrates a radio frequency distribution device 600 for receiving multiple signals from conventional consumer electronic devices. In this embodiment, the device 600 receives signals from video devices, however, the device 600 could receive signals from any type of consumer electronic device, such as a audio device or a data device. The signals received by device 600 are the baseband signals. Device 600 includes 4 input ports 602, 604, 606, and 608. This is only an exemplary embodiment, and as such, device 600 could include more or less than four input ports. Each input port may include a respective terminal point 601, 603, 605, or 607. Each input signal is transmitted from its input port to a respective modulator. For example, input port 602 is coupled to a modulator 612, input port 604 is coupled to a modulator 614, input port 606 is coupled to a modulator 616, and input port 608 is coupled to a modulator 618. Each modulator varies a respectively different carrier signal in accordance with a respective modulating signal received via the corresponding input port. Further, each of the signals is appropriately filtered such that its respective frequency range has a bandwidth of, for example, less than 6 megahertz.

Figure 9:
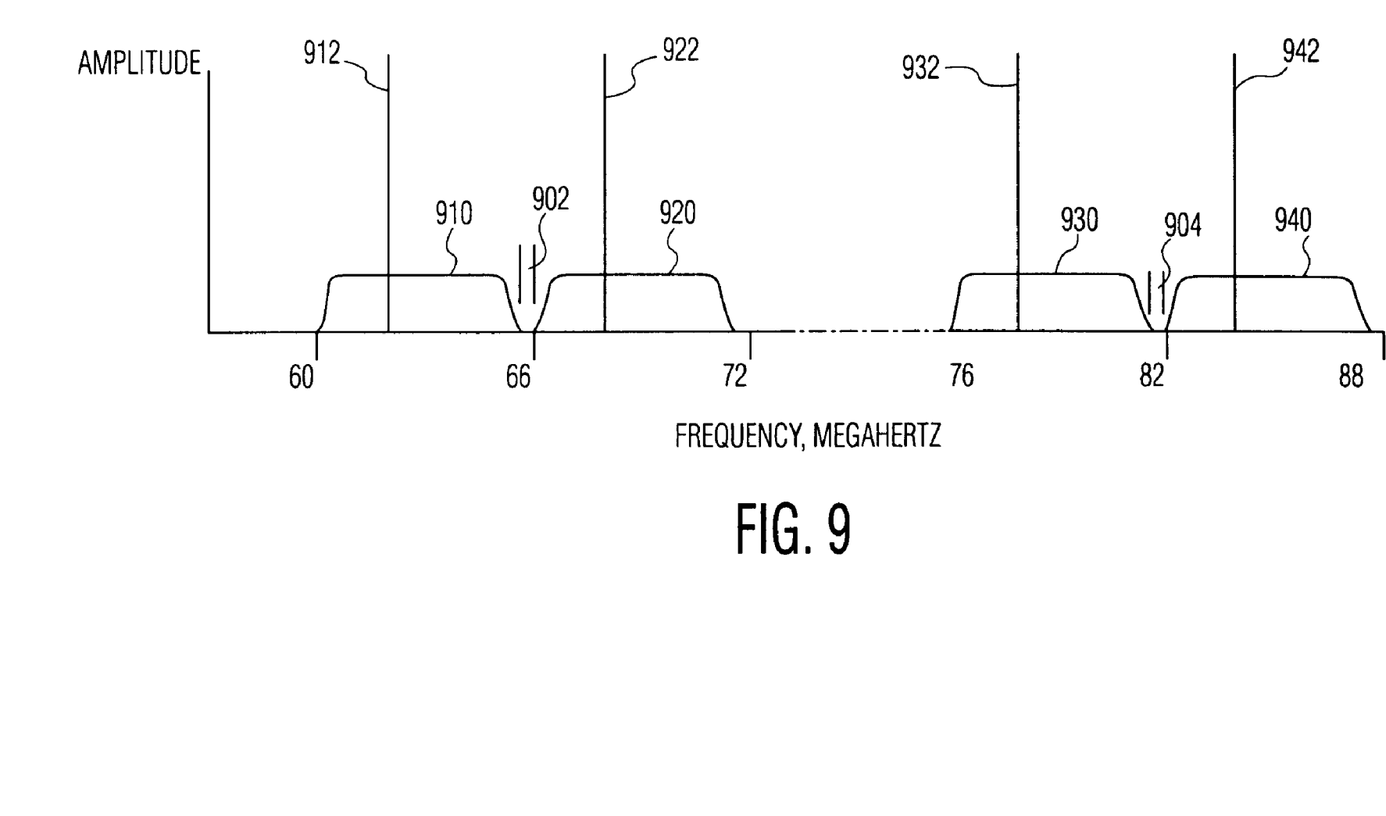
FIG. 9 is a graph of frequency versus amplitude which is useful for describing the operation of the embodiments of the invention shown in FIGS. 3 through 8.

FIG. 9 illustrates an exemplary frequency spectrum of modulated and filtered signals (with a bandwidth of less than 6 megahertz) transmitted from multiple consumer electronic video devices, similar to the embodiment illustrated in FIGS. 3, 4, 5 and 6. The coordinate axes shown in FIG. 9 includes frequency (measured in megahertz) along the x-axis, and amplitude along the y-axis. Four broadcast signals 910, 920, 930, and 940 are provided along the x-axis. Each of the signals has a nominal 6 megahertz bandwidth. Signal 910 represents a channel 3 signal, which has a nominal frequency range of 60–66 megahertz. Picture carrier 912 is shown at approximately 61.25 megahertz. Likewise, signals 920, 930, and 940, represent channels 4, 5, and 6 respectively. As can be seen, channel 4 has a nominal frequency range of 66–72 megahertz, channel 5 has a nominal frequency range of 76–82 megahertz, and channel 6 has a nominal frequency range of 82–88 megahertz. Picture carriers 922, 932, and 942 are shown at their respective frequencies of approximately 67.25 megahertz, 77.25 megahertz, and 83.25 megahertz.

FIG. 9 also shows a guard band 902 between the channel 3 signal 910 and the channel 4 signal 920. Likewise, a guard band 904 is provided between the channel 5 signal 930 and the channel 6 signal 940. The frequency spectrum (including guard bands) illustrated in FIG. 9 applies to various embodiments of the present invention that concurrently provide a channel 3, channel 4, channel 5, and channel 6 signal.

The modulators used in the exemplary systems shown in FIGS. 3, 4, 5 and 6, described above as well as the system shown in FIG. 7, described above, generate signals that conform to the frequency spectra shown in FIG. 9. Thus, each of the generated channel signals is separated from adjacent channel signals by a guard band to prevent interference among the signals.

Referring again to FIG. 6, the output signals from modulators 612, 614, 616, and 618 are combined in combiner 620. Combiner 620 then transmits an output signal to output port 622. Output port 622 may include a terminal 621, as shown in FIG. 6. The output signal from output port 622 can be transmitted to any number of video display devices, or alternatively, to an input port of a consumer electronic video device, as explained above with reference to FIG. 5. For example, a video display device may be tuned to receive a signal at the frequency for a given channel, such as channel 3, 4, 5, or 6.

Figure 7:
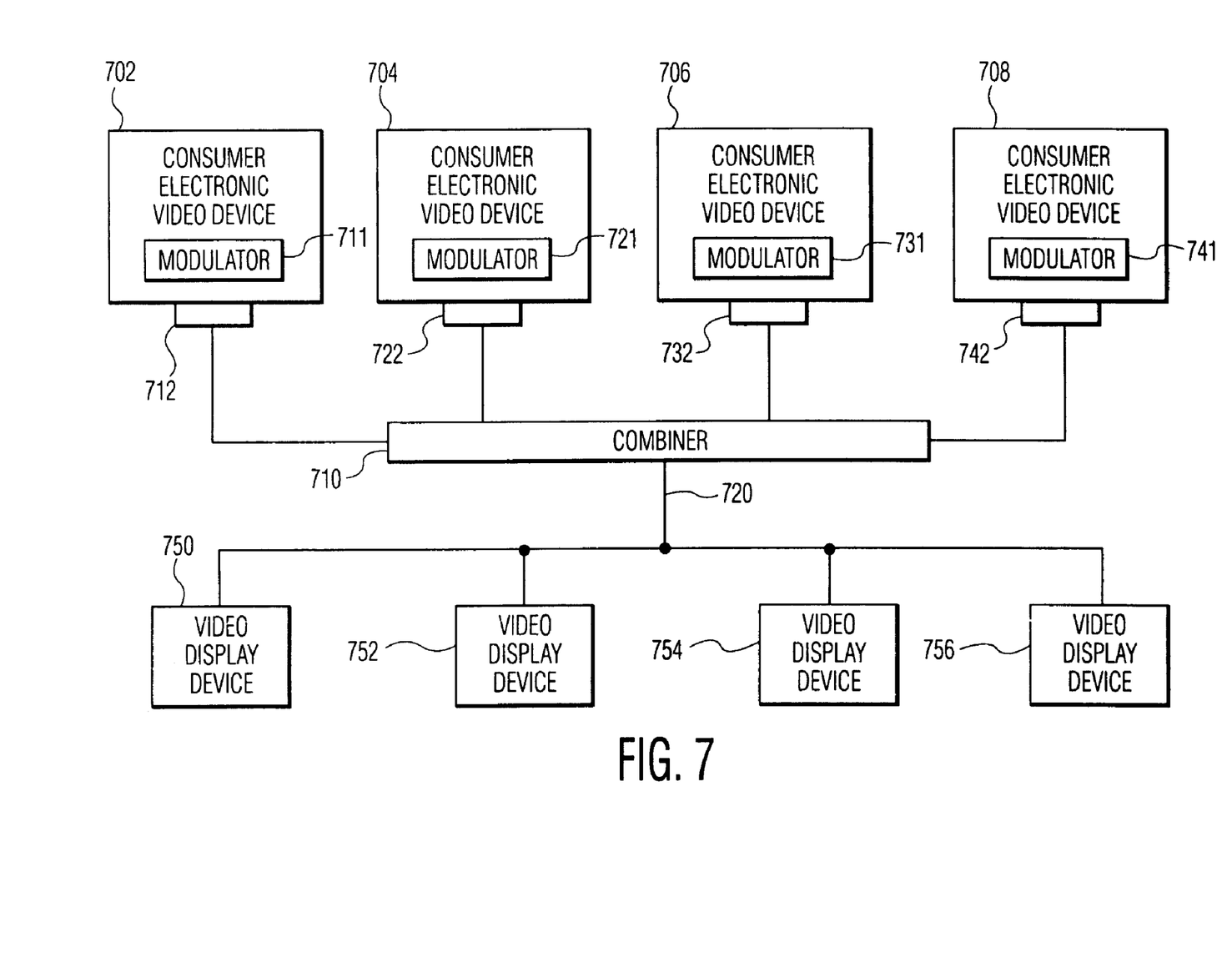
FIG. 7 is a block circuit diagram illustrating a radio frequency signal distribution system in accordance with yet another exemplary embodiment of the present invention.

FIG. 7 illustrates an embodiment of the present invention that is very similar to the embodiment described by reference to FIG. 4. In this embodiment, each consumer electronic device is a video device, however, each device could be any type of consumer electronic device, such as a audio device or a data device. Four consumer electronic video devices 702, 704, 706, and 708 are provided in FIG. 7. Each device includes a respective modulator (711, 721, 731 and 741). Further, each of the consumer electronic video devices transmits a signal to a combiner 710, and output signals from the combiner 710 are transmitted to one of the video display devices 750, 752, 754 and 756. As in the previous embodiments, each of the video display devices may be tuned to receive a frequency of any of the appropriate radio frequency channels (i.e., 3, 4, 5 or 6). However, in contrast to the embodiment described by reference to FIG. 4, each of the consumer electronic video devices (702, 704, 706 and 708) in FIG. 7 includes a single respective output port. For example, device 702 includes a single output port 712 which may be used to transmit a signal with a radio frequency corresponding to any of a number of channels, for example, channels 3, 4, 5, and 6. Devices 704, 706, and 708 each include a respective output port 722, 732, and 742.

Figure 8:
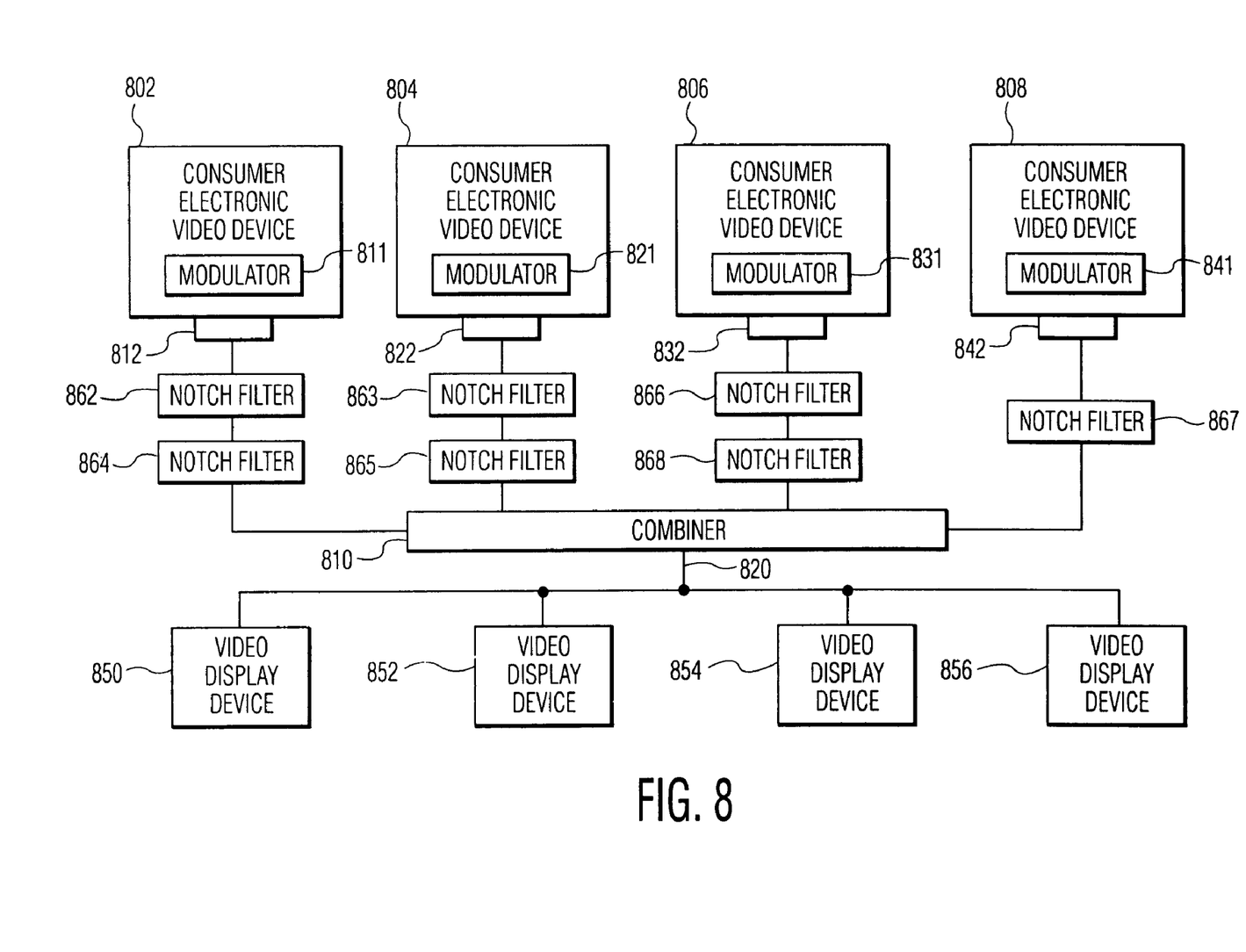
FIG. 8 is a block circuit diagram illustrating a radio frequency signal distribution system in accordance with yet another exemplary embodiment of the present invention.

FIG. 8 illustrates an additional exemplary embodiment of the present invention. In this embodiment, each consumer electronic device is a video device, however, each device could be any type of consumer electronic device, such as a audio device or a data device. FIG. 8 provides four consumer electronic video devices 802, 804, 806, and 808, each with a respective modulator 811, 821, 831, and 841. As with the embodiment described by reference to FIG. 7, each of the devices 802, 804, 806, and 808 shown in FIG. 8 include a single respective output port 812, 822, 832, and 842. Each of the output signals transmitted by a device and through its respective output port is transmitted through one or more notch filters before entering combiner 810.

For example, an output signal transmitted by consumer electronic video device 802 passes through output port 812, and then reaches notch filter 862 and notch filter 864. In a given circumstance it may be desired to transmit a channel 3 radio frequency signal from consumer electronic video device 802. In order to ensure that there is an adequate band to protect the signal from interference of adjacent channels, it may be desirable to include a notch filter for at least the higher frequencies of channel 2 and a notch filter for at least the lower frequencies of channel 4 (the two channels adjacent to channel 3). Therefore, notch filter 862 may filter interference corresponding to a channel 2 signal, while notch filter 864 may filter interference corresponding to a channel 4 signal. Therefore a channel 3 signal with negligible interference is provided to combiner 310 by device 802 through the use of notch filters 862 and 864.

In the embodiment illustrated in FIG. 8, consumer electronic video devices 804, 806, and 808 also include respective notch filters to provide signals substantially free from adjacent channel interference to combiner 810. For example, it may be desired to transmit a channel 4 radio frequency signal from consumer electronic video device 804. In order to ensure that there is an adequate band to protect from interference of adjacent channels, it may be desirable to include a notch filter for at least the higher frequencies of channel 3 and a notch filter for at least the lower frequencies of channel 5 (the two channels adjacent to channel 4). Therefore, notch filter 863 may filter interference corresponding to a channel 3 signal, while notch filter 865 may filter interference corresponding to a channel 5 signal. Therefore a channel 4 signal with negligible interference is provided to combiner 810 by device 804 through the use of notch filters 863 and 865.

Further, it may be desired to transmit a channel 5 radio frequency signal from consumer electronic video device 806. In order to ensure that there is an adequate band to protect from interference of adjacent channels, it may be desirable to include a notch filter for at least the higher frequencies of channel 4 and a notch filter for at least the lower frequencies of channel 6 (the two channels adjacent to channel 5). Therefore, notch filter 866 may filter interference corresponding to a channel 4 signal, while notch filter 868 may filter interference corresponding to a channel 6 signal. Therefore a channel 5 signal with negligible interference is provided to combiner 310 by device 806 through the use of notch filters 866 and 868. Similarly, it may be desired to transmit a channel 6 radio frequency signal from consumer electronic video device 808. In order to ensure that there is an adequate band to protect from interference of adjacent channels, it may be desirable to include a notch filter for at least the higher frequencies of channel 5 (the channel adjacent channel 6). It is not required to include a notch filter for channel 7 because the frequency spectrum shifts substantially between channel 6 and channel 7, such that a notch filter would not be required. Notch filter 867 may filter interference corresponding to a channel 5 signal. Therefore a channel 6 signal with negligible interference is provided to combiner 310 by device 808 through the use of notch filter 867.

While two notch filters (863, 865) are included in FIG. 8 to provide a channel 5 signal with negligible interference from adjacent channels, both filters may not be required. For example, the channel 5 frequency range is approximately 76–82 megahertz, while the channel 4 frequency range is 66–72 megahertz. Consequently, there is no overlap between the channel 4 and the channels 5 frequency range. Therefore, depending on the output signals provided by the respective modulators, only a notch filter corresponding to the lower frequencies of channel 6 may be used to provide a clean channel 5 signal.

Therefore, although two notch filters may be illustrated in a particular circuit in FIG. 8, two notch filters may not always be required in a given scenario.

The notch filters shown in FIG. 8 (862, 863, 864, 865, 866, 867 and 868) are shown independent of their respective consumer electronic video devices and independent of combiner 810, however, this is simply an exemplary embodiment. In this embodiment, each of the notch filters may be a variable notch filter such that the filter could be tuned to a desired frequency. For example, if it is desired to transmit a channel 3 signal using consumer electronic video device 802, then notch filter 862 may be used to filter out channel 2 interference. However, if it is desired to transmit a channel 6 signal using consumer electronic video device 802, then notch filter 862 may be used to filter out channel 5 interference. As such, each of the notch filters should be variable in that it could be tuned to filter out a desired frequency. Alternatively, each consumer electronic video device may include multiple, switchable, fixed filters.

In an embodiment where the notch filters are included in the consumer electronic video device (not shown), it may be desirable to include a variable notch filter, for the reason described above. However, if a given consumer electronic video device includes an output port for each prospective channel, then a pair of notch filters may be included for each channel within the device, and these filters would not need to be variable.

The embodiment shown in FIG. 8 may also be used to integrate legacy consumer electronic video devices, that do not limit the bandwidth of the modulated signal, into a distribution system according to the subject invention.

In another embodiment, the notch filters could be included in the combiner (not shown). For example, a combiner could include an input port for each prospective radio frequency channel. As such, the combiner could include an input port for each of channel 3, 4, 5, and 6. Each of the input ports could then include the appropriate fixed notch filters for filtering adjacent channel interference. Therefore, if a combiner included a channel 3 input port, the input port could include a channel 2 and a channel 4 notch filter. Accordingly, in this embodiment, the notch filters included within the combiner would not be required to be variable in their design.

Referring again to FIG. 8, combiner 810 then transmits the signals from each of the devices 802, 804, 806, and 808 concurrently on cable 820, which may be a coaxial cable. The combined signal is transmitted to numerous video display devices, such as devices 850, 852 854, and 856. The receivers in each of the video display devices may be tuned to receive a given radio frequency signal, for example, video display device 850 may be tuned to receive a channel 3 signal, while video display device 852 may be tuned to receive a channel 4 signal.

Figure 10:
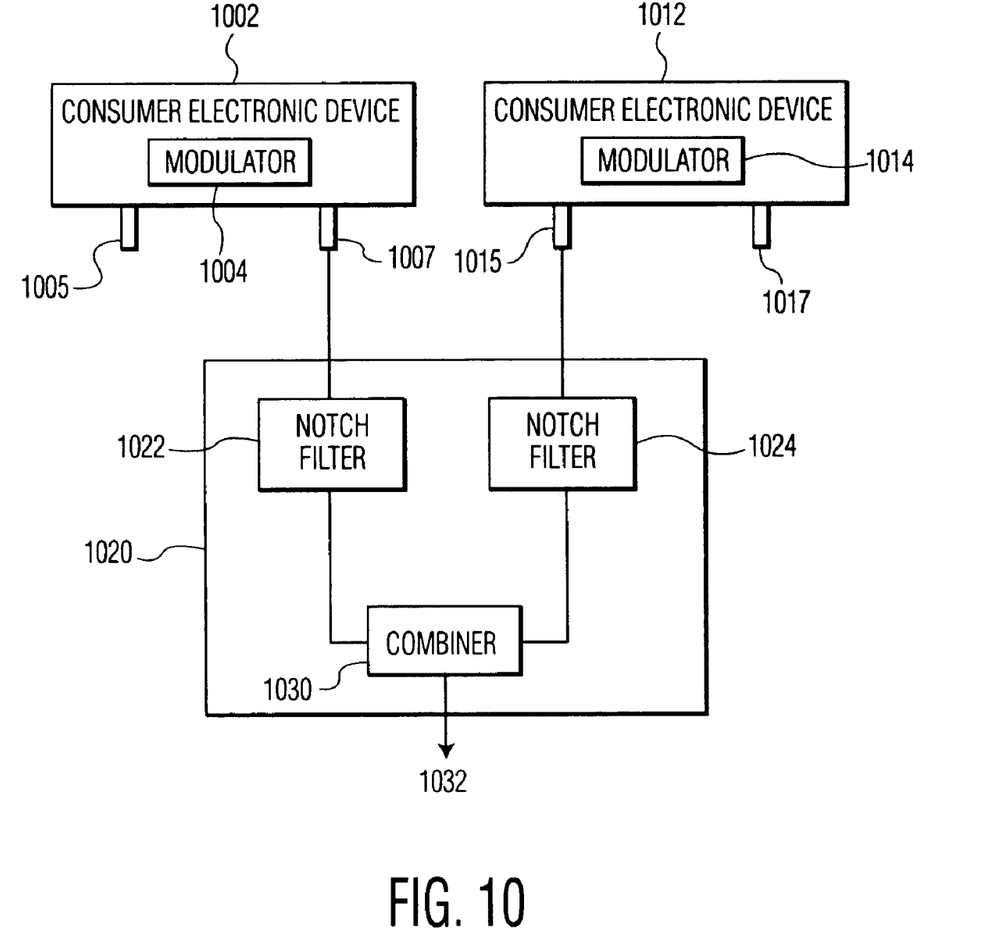
FIG. 10 is a block circuit diagram illustrating a radio frequency signal distribution system in accordance with yet another exemplary embodiment of the present invention.

FIG. 10 illustrates consumer electronic devices 1002 and 1012. Each device could be any type of consumer electronic device, such as a video device, audio device or a data device, however, in this embodiment, device 1002 and 1012 are video devices (e.g., VCR, DVD player). Device 1002 includes a modulator 1004, while device 1012 includes a modulator 1014. Device 1002 includes two output ports, 1005 and 1007. Each output port corresponds to a specific channel output, for example, port 1005 corresponds to an NTSC telesvision channel 3 output, and port 1007 corresponds to a channel 4 output. Device 1012 includes a output port 1015 corresponding to a channel 3 output, and output port 1017 corresponding to a channel 4 output.

Device 1002 transmits a channel 4 signal via output port 1007 to radio frequency distribution device 1020, and device 1012 transmits a channel 3 signal via output port 1015 to radio frequency distribution device 1020. Radio frequency distribution device 1020 includes notch filters 1022 and 1024. Notch filter 1022 filters channel 3 interference from the channel 4 signal. Notch filter 1024 filters channel 4 interference from the channel 3 signal. Combiner 1030, included in radio frequency distribution device 1020, receives the filtered channel 4 signal from notch filter 1022, and the filtered channel 3 signal from notch filter 1024. Combiner 1030 then transmits a combined signal 1032 (for example, on a coaxial cable) including the channel 3 and channel 4 signals, now mutually exclusive of one another.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed:

1. A consumer electronic device comprising:
    circuitry configured to transmit a respective signal corresponding to a respective one of at least three radio frequency channels, the circuitry including:
        a modulator configured to modulate said signal such that each modulated signal includes first signal components in a predetermined frequency range corresponding to a selected one of the at least three radio frequency channels and second signal components that extend beyond the predetermined frequency range at frequencies higher and lower than the predetermined frequency range to overlap the respective predetermined frequency range of at least one adjacent one of the at least three radio frequency channels, and
        at least one notch filter configured to filter from said modulated signal a portion of the second components of the modulated signal exclusive of the first signal components
            wherein the modulator for a lowest one of the at least three radio frequency channels does not have a notch filter for filtering the second components of the modulated signal that extend beyond the predetermined frequency range at lower frequencies.

2. A consumer electronic video device according to claim 1 wherein said consumer electronic device is a video device, and said signal is a video signal.

3. A consumer electronic video device according to claim 2 wherein said consumer electronic video device is selected from the group consisting of video cassette recorders, digital video disc players, gaming units, satellite set tops and cable set tops.

4. A radio frequency signal distribution network, said network comprising:
    a plurality of consumer electronic video devices, each of said devices including circuitry configured to transmit a first video signal corresponding to a selected one of a plurality of radio frequency channels, the circuitry including:
        a modulator configured to modulate said video signal such that the modulated video signal includes first signal components in a predetermined frequency range corresponding to a respective one of the plurality of radio frequency channels and second signal components that extend beyond the predetermined frequency range at frequencies higher and lower than the predetermined frequency range to overlap the respective predetermined frequency range of at least one adjacent one of the plurality of radio frequency channels, and
        at least one notch filter configured to reduce, in amplitude, a portion of the second components of the modulated video signal exclusive of the first signal components, wherein the modulator for a lowest one of the at least three radio frequency channels does not have a notch filter for filtering the second components of the modulated signal that extend beyond the predetermined frequency range at lower frequencies;
    a signal combiner for combining a respective output signal from each of said plurality of consumer electronic video devices to generate a combined output signal; and
    a single conductive path for distributing the combined output signal to a plurality of video receivers.

5. A radio frequency signal distribution network, said network comprising:
    a plurality of consumer electronic video devices, each of said devices including circuitry configured to transmit a first video signal corresponding to a selected one of a plurality of radio frequency channels, the circuitry including a modulator configured to modulate said video signal such that the modulated video signal fails within one of a plurality of mutually exclusive predetermined frequency ranges, each mutually exclusive frequency range having a bandwidth of less than 6 megahertz and corresponding to a respective one of the plurality of radio frequency channels, and
    a signal combiner for combining a respective output signal from each of said plurality of consumer electronic video devices to generate a combined output signal;
    a single conductive path for distributing the combined output signal to a plurality of video receivers; and
    at least one video display device coupled to the single conductive path for receiving the combined signal from said combiner.

6. A consumer electronic video device, said device comprising:
    a plurality of video signal input ports, each of said ports configured to receive a respectively different one of a plurality of signals;
    a plurality of modulators, each of said modulators coupled to a respective one of the video signal input ports for modulating a respective one of the plurality of signals to produce a plurality of modulated signals, whereby each of said modulated signals occupies a mutually exclusive radio frequency range;
    a plurality of notch filters, each of said notch filters coupled to a respective one of said modulators, each of said notch filters being configured to receive a respective one of said plurality of modulated signals and to filter from said respective one of said plurality of modulated signals portions of said respective one of said plurality of modulated signals that may interfere with an adjacent radio frequency channel to produce a plurality of filtered signals, wherein the plurality of notch filters includes at least first and second notch filters coupled in series between said respective one of said modulators and said combiner, the first notch filter being configured to reduce, in amplitude, interfering signals corresponding to an adjacent one of said plurality of modulated signals occupying a frequency range less than the frequency range of the modulated signal produced by the respective one modulator, and the second notch filter being configured to reduce, in amplitude, interfering signals corresponding to a further adjacent one of said plurality of modulated signals occupying a frequency range higher than the frequency range of the modulated signal produced by the respective one modulator;

a combiner for receiving and combining said plurality of filtered signals from said plurality of notch filters to produce a combined output signal; and an output port through which said output signal is transmitted.

7. A consumer electronic video device according to claim 6 wherein said consumer electronic device is selected from the group consisting of video devices, audio devices or data devices.

8. A consumer electronic video device according to claim 6 wherein each of said plurality of signals received by said plurality of video signal input ports is provided by a respective apparatus selected from the group consisting of video cassette recorders, digital video disc players, gaming units, satellite set top boxes and cable set top boxes.

9. A radio frequency device comprising:

first and second notch filters configured to receive a modulated input signal corresponding to a main radio frequency channel, and configured to reduce, in amplitude, portions of the modulated input signal in respective first and second guard bands between said main radio frequency channel and first and second respective radio frequency channels adjacent to said main radio frequency channel such that said modulated input signal is converted to a filtered modulated signal;

third and fourth notch filters configured to receive a second modulated input signal corresponding to the second radio frequency channel, and configured to reduce, in amplitude, portions of the second modulated input signal in the second guard band and in a third guard band between the second radio frequency channel and a third radio frequency channel adjacent to the second radio frequency channel to produce a second filtered modulated signal; and a combiner for combining said main filtered modulated signal and said second filtered modulated signal.

10. A consumer electronic device according to claim 6, wherein:

(1) said plurality of modulators further comprises n modulators comprising:

(a) a first modulator configured to produce a first modulated signal occupying a lowest frequency range in the plurality of modulated signals, said lowest frequency range corresponding to a lowest channel;

(b) a last modulator configured to produce a last modulated signal occupying a highest frequency range in the plurality of modulated signals, said highest frequency range corresponding to a highest channel; and (c) a second plurality of modulators numbering n−2 modulators, each of said n modulators configured to produce one of n−2 modulated signals occupying frequency ranges between said lowest frequency range and said highest frequency range, said n−2 modulated signals corresponding to n−2 channels between said lowest and highest channels; and (2) said plurality of notch filters further comprises 2n−2 notch filters comprising:

(a) a first notch filter coupled to said first modulator, said first notch filter configured to receive said first modulated signal and to filter from said first modulated signal portions of the first modulated signal which interfere with a next highest channel of said n−2 channels;

(b) a last notch filter coupled to said last modulator, said last notch filter configured to receive said last modulated signal and to filter from said last modulated signal portions of the last modulated signal that interfere with a next lowest channel of said n−2 channels; and (c) a second plurality of notched filters comprising n pairs of notched filters, each of said n pairs of notched filters comprising further first and second notch filters coupled in series, said further first notch filter coupled to a respective one of said n−2 modulators and configured to receive a respective one of said n−2 modulated signals, said second notch filter coupled to said combiner.

11. A consumer electronic device according to claim 10 wherein said further first notch filter is configured to filter from said respective one of said n−2 modulated signals portions of said respective one of said n−2 modulated signals that interfere with a next lowest channel, and said further second notch filter is configured to filter from said respective one of said n−2 modulated signals portions of said respective one of said n−2 signals that interfere with a next higher channel.

* * * * *